(12) United States Patent
Risbjerg Jarlkov et al.

(10) Patent No.: US 10,556,213 B2
(45) Date of Patent: Feb. 11, 2020

(54) CATALYTIC CHEMICAL REACTOR COMPRISING A FLOATING TRAY

(71) Applicant: Haldor Topsøe A/S, Kgs. Lyngby (DK)

(72) Inventors: Klaus Risbjerg Jarlkov, Hårlev (DK); Emir Zahirovic, Copenhagen NV (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 16/309,545

(22) PCT Filed: Jun. 8, 2017

(86) PCT No.: PCT/EP2017/063966
§ 371 (c)(1),
(2) Date: Dec. 13, 2018

(87) PCT Pub. No.: WO2018/001694
PCT Pub. Date: Jan. 4, 2018

(65) Prior Publication Data
US 2019/0329205 A1   Oct. 31, 2019

(30) Foreign Application Priority Data
Jun. 28, 2016 (DK) .................................. 2016 00385

(51) Int. Cl.
*B01J 8/00* (2006.01)
*B01J 8/02* (2006.01)
*C10G 49/00* (2006.01)

(52) U.S. Cl.
CPC ............. *B01J 8/0085* (2013.01); *B01J 8/025* (2013.01); *B01J 8/0278* (2013.01); *C10G 49/002* (2013.01); B01J 2208/00938 (2013.01); B01J 2219/00247 (2013.01)

(58) Field of Classification Search
CPC .............................................. B01J 2208/00938
See application file for complete search history.

(56) References Cited

U.S. PATENT DOCUMENTS

| 3,489,529 | A | * | 1/1970 | Dudych | ................. | B01J 8/0492 422/605 |
| 4,421,723 | A | * | 12/1983 | Farnham | ................ | B01J 8/0214 208/146 |
| 8,241,492 | B1 | | 8/2012 | Yuan | | |
| 2004/0141892 | A1 | * | 7/2004 | Van Hasselt | ........... | B01D 3/008 422/600 |
| 2012/0230883 | A1 | | 9/2012 | Jang et al. | | |
| 2012/0300577 | A1 | | 11/2012 | Buttridge et al. | | |
| 2013/0082125 | A1 | | 4/2013 | Akin et al. | | |
| 2014/0097125 | A1 | | 4/2014 | Bazer-Bachi et al. | | |

FOREIGN PATENT DOCUMENTS

WO    WO 97/46303 A1   12/1997

* cited by examiner

*Primary Examiner* — Lessanework Seifu
(74) *Attorney, Agent, or Firm* — Blank Rome LLP

(57) ABSTRACT

A catalytic reactor comprises a floating tray fluid distributor and optionally also an integrated particle separator which is modular build to be assembled inside the reactor and which has support members enabling the floating tray to be floating supported by the catalyst bed inside the reactor.

19 Claims, 3 Drawing Sheets

CATALYTIC CHEMICAL REACTOR COMPRISING A FLOATING TRAY

FIELD OF THE INVENTION

This invention relates to a catalytic chemical reactor with fluid distribution and optionally also particle separation. More specifically the invention relates to chemical reactor comprising a floating tray fluid distributor which is supported by the catalyst bed in the reactor and which is made of segments enabling the floating tray to be assembled within the reactor as well as detached and removed from the reactor via the existing service openings of the reactor, i.e. without cutting open the reactor. The reactor can be a down-flow catalytic reactor which includes vertically superimposed packed beds of particulate catalytic material. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydride-metallisation—HDM), oxygen conversion (hydrodeoxygenation—HDO) and hydrocracking (HC).

BACKGROUND OF THE INVENTION

In catalytic chemical reactors it may be advantageous to provide an even distribution of the inlet process fluid flow to the catalytic bed within the reactor, as this enhances the utilization and efficiency of the catalyst. This may be accomplished by fluid distributors located in the top of the reactor down-stream of the process gas inlet and above the catalyst bed.

In some cases, the process fluid supplied to the reactor comprises particles. As the particles may choke the catalyst, the life time of the catalyst may be prolonged if also a particle separator is located between the process gas inlet and the catalyst bed in the reactor. Optionally, the fluid distributor and the particle separator may be combined to one integrated unit, a tray fluid distributor and particle separator.

In the industry, for instance in the refinery industry, a significant number of reactors do not have any support ring to support a conventional type of tray design. However, the need for a tray to optimize fluid distribution or to collect scales or both may still exist. In order to meet that requirement the present invention discloses a new type of tray, which can be supported on the catalyst itself, a floating tray. The present invention further describes a range of improvements regarding mounting and dismantling of the floating tray within the reactor, emptying of collected particles, quick connections to mention some of the features.

US2009177023 discloses a filtration tray for a fixed bed reactor with a co-current down-flow of gas and liquid. The device can trap plugging particles contained in the liquid feed supplying a reactor functioning in gas and liquid co-current down-flow mode using a specific distributor tray comprising a filtration medium. The device is of particular application to the selective hydrogenation of feeds containing acetylenic and dienic compounds.

EP0358923 discloses a process and an apparatus for purifying a raw gas originating from the gasification of solids. In a process and apparatus for purifying raw gas from solids gasification, containing granular and dusty solids particles, a solution is to be found, by means of which solids particles of any size are largely removed from the raw gas before entry to downstream cooling devices. This is achieved when the raw gas is passed in a first purification stage from the gasification zone in a straight line in the direction of a gas-holding space, whereby the granular solids particles are precipitated at the bottom of the gas-holding space and then, in a second purification stage, the partially purified raw gas is laterally deflected from the gas-holding space and undergoes a change to a velocity reduced by a factor of at least 3 and, after a further gas deflection, is passed substantially in the vertical direction through a solids filter, where the dusty solids particles are removed from the raw gas.

U.S. Pat. No. 7,470,410 discloses a support system for use with a reactor vessel that defines a reactor zone and has an inlet manway providing an opening into the reactor zone. The support system comprises a manway insert that is supported by the inlet manway and extends through the opening of the inlet manway and into the reactor zone. Attached to the manway insert is attachment means for connecting a support hanger to the manway insert and for transferring the load from the support hanger to the manway insert. The support hanger has an upper end and a lower end with the upper end being fixedly attached to the attachment means and the lower end being fixedly attached to support structure means for supporting a load.

In spite of the above mentioned known art, a need exists for a reactor with a fluid distributor and optionally also a particle separator to ensure prolonged effective operation of the reactor and which may be installed and easily removed from the reactor without the need for support means attached to the reactor and utilizing the available existing openings in the reactor for service, assembly and dismantling.

SUMMARY OF THE INVENTION

The present invention describes a novel catalytic chemical reactor comprising a floating tray fluid distributor and optionally also a particle separation system.

According to the invention, the floating tray is made of segments which are assembled within the reactor and which are easily removed from the reactor in segments. An important feature of the invention are support members which enables the floating tray to be supported on top of the catalyst bed within the reactor without the need for support members fixed to the reactor.

FEATURES OF THE INVENTION

The invention relates to catalytic reactor with a catalyst bed or a plurality of catalyst beds within the reactor as known in the art. In an embodiment of the invention, the reactor has a tray in the upper part, located downstream a process fluid inlet and upstream the catalyst bed(s). The tray is adapted to provide distribution of the process fluid entering the reactor evenly to the catalyst bed. To provide easy mounting, dismantling, emptying and removal of the tray in and from the reactor, it is made as an assembly of a plurality of tray sections. The tray is provided with fluid distribution elements, which provides the mentioned even fluid distribution to the catalyst bed(s). An important feature of the reactor is that the fluid distribution tray comprises a plurality of tray supports which enables the tray to be supported on top of the catalyst bed, i.e. it "floats" on the catalyst bed. Especially important when retrofitting reactors which were not originally designed for a fluid distribution tray, this makes it possible to mount and support the floating tray without the need for supports fixed to the reactor by e.g. welding or support hangers. To ensure that the process fluid distribution to the catalyst bed is optimized, the tray supports may in an embodiment comprise a wire mesh which is adapted to distribute the load of the tray to the catalyst bed without crushing the particles, but still enable the process fluid to pass through the support via the apertures in the wire mesh. The wire mesh or heavy wire mesh has the advantage of being able to in some extent adapt to the uneven surface of the catalyst bed, which evens out the load of the floating tray.

In a further embodiment of the invention, the floating tray not only acts as a fluid distributor, but further has the feature of collecting at least of any particles comprised in the inlet process fluid to the reactor. In this embodiment, the tray sections have a section base which is adapted to collect the particles. In a further embodiment the mentioned fluid distribution elements are in the shape of vertical ducts fixed to the section bases, e.g. circular tubes which are in fluid connection to the catalyst bed through one opening and an aperture in the section base and the other opening in the top of the tube in fluid connection to the upper side of the tray and to the process fluid entering the reactor. As the process gas enters the top of the reactor, the flow velocity is reduced and at least a part of the particles which may be in the process fluid is allowed to settle on the section base before the process fluid flows further through the distribution elements to the catalyst bed below the tray. This has the advantage that the catalyst is not polluted or clogged by the particles which are collected. The collected particles may be removed from the reactor or the tray sections may be emptied onto the catalyst bed if the bed is to be removed from the reactor. As the process fluid may comprise a vapour phase the fluid distribution elements may in an embodiment also comprise apertures on the side of the fluid distribution elements and in a height over the section base related to the desired fluid level in the tray.

In an embodiment of the invention, the tray is made of one centre section with a circular cross sectional area and a plurality of outer tray sections which have a circular trapezoid shape. The inner curved bases of the outer tray sections are adapted to fit the outer circumference of the centre tray section and the outer curved bases of the outer tray sections are adapted to fit inside the reactor. Therefore when the tray sections are assembled, they form one integrated unit which fits the inside cross sectional area of a reactor with a circular cross sectional area. The trays may all be connected by connecting means of any kind known in the art. In an embodiment the connecting means comprise quick release locks which may be easy operated and even remotely operated from outside the reactor through for instance the process gas inlet opening, which facilitates easy and safe mounting and removal of the floating tray without the need for any persons to enter the reactor. The handling of the tray may be enabled by means of lifting eyes on some or all the tray sections. To further ease the mounting and dismantling of the tray, one of the outer tray sections may comprise a plurality of sections which have a geometry preventing the to squeeze when removed of mounted in the reactor.

In an embodiment, the floating tray forms a rigid unit which is able to remain fixed in its position in the reactor even in case the catalyst bed settles and in some places sinks because of the stiffness and strength of the assembled tray and optionally also by breaking means mounted on the tray which fixes the tray to the reactor inner wall.

The catalytic reactor of the invention may be a hydroprocessing reactor or any other type of the reactor which may be optimized by comprising the above described tray.

FEATURES

1. Catalytic reactor comprising a catalyst bed, said reactor comprises a floating tray fluid distributor, distributing a reactor inlet fluid stream to the catalyst bed, said floating tray comprises a plurality of separate detachable tray sections and at least one fluid distribution element, wherein a plurality of said tray sections further comprises at least one tray support to support said floating tray on top of the catalyst bed.

2. Catalytic reactor according to feature 1, wherein said floating tray is a combined fluid distributor and particle separator for separating particles from the reactor inlet fluid stream and distributing said inlet fluid stream to the catalyst bed, wherein a plurality of said tray sections each further comprise a section base adapted to collect particles.

3. Catalytic reactor according to any of the preceding features, wherein said tray support comprises a wire mesh adapted to transfer the load of said floating tray to the top of the catalyst bed.

4. Catalytic reactor according to any of the preceding features, wherein said tray support is adapted to act also as fluid stream distributor.

5. Catalytic reactor according to any of the preceding features, comprising one centre tray section and a plurality of outer tray sections.

6. Catalytic reactor according to feature 4, wherein the centre tray section has a circular cross section and the outer tray sections have a circular trapezoid shape, the inner curved bases of the outer tray sections are adapted to fit the outer circumference of the centre tray section and the outer curved bases of the outer tray sections are adapted to fit inside the reactor.

7. Catalytic reactor according to any of the preceding features, wherein the at least one distribution element are ducts with any cross sectional shape, a first end of each duct has an aperture and a second end of each duct is connected to a section base and an aperture in the section base within the periphery of the second end of each duct ensures fluid connection from the first end of each duct through the duct and through the section bases to enable fluid to flow from the upper side of the floating tray to the catalytic bed below the floating tray.

8. Catalytic reactor according to feature 7, wherein the at least one distribution element comprises one or more apertures on at least one of the sides of the duct.

9. Catalytic reactor according to feature 8, wherein the one or more apertures on at least one of the sides of the duct are oriented away from the centre of the floating tray.

10. Catalytic reactor according to any of the features 7-9, wherein the at least one distribution element has a circular cross section.

11. Catalytic reactor according to any of the preceding features, comprising a plurality of said distribution elements, wherein the distribution elements are evenly distributed on the cross section of the floating tray to provide an even distribution of fluid from the inlet fluid stream to the catalytic bed below the floating tray.

12. Catalytic reactor according to any of the preceding features, wherein a plurality of the tray sections are connected by quick release locks.

13. Catalytic reactor according to feature 12, wherein said quick release locks are adapted to be remote released.

14. Catalytic reactor according to any of the preceding features, wherein at least one of said tray sections comprise at least one lifting eye to enable the tray sections to be positioned within and removed from the reactor from outside the reactor.

15. Catalytic reactor according to any of the features 2-14, wherein at least one of said lifting eye is arranged off centre to the tray sections, enabling emptying collected particles from said tray sections within the reactor.

16. Catalytic reactor according to any of the preceding features, wherein at least on tray section comprise a plurality of sections with a cross sectional geometry enabling removal from the reactor without being locked by the adjacent tray sections.

17. Catalytic reactor according to any of the preceding features, wherein at least one of said tray sections comprise assembly means and said tray sections are interlocked by said assembly means when assembled to form the floating tray as one integrated, rigid unit.

18. Catalytic reactor according to any of the preceding features, wherein at least one of said tray sections comprise breaking means adapted to fix the floating tray to the inside of the reactor.

19. Catalytic reactor according to any of the preceding features, wherein said catalytic reactor is a hydroprocessing reactor.

20. Catalytic reactor according to any of the preceding features, wherein the reactor has a dome shaped upper part, the floating tray is located beneath or within the lower part of the dome.

BRIEF DESCRIPTION OF THE DRAWINGS

The invention is further illustrated by the accompanying drawings showing examples of embodiments of the invention.

POSITION NUMBERS

Figure 1:
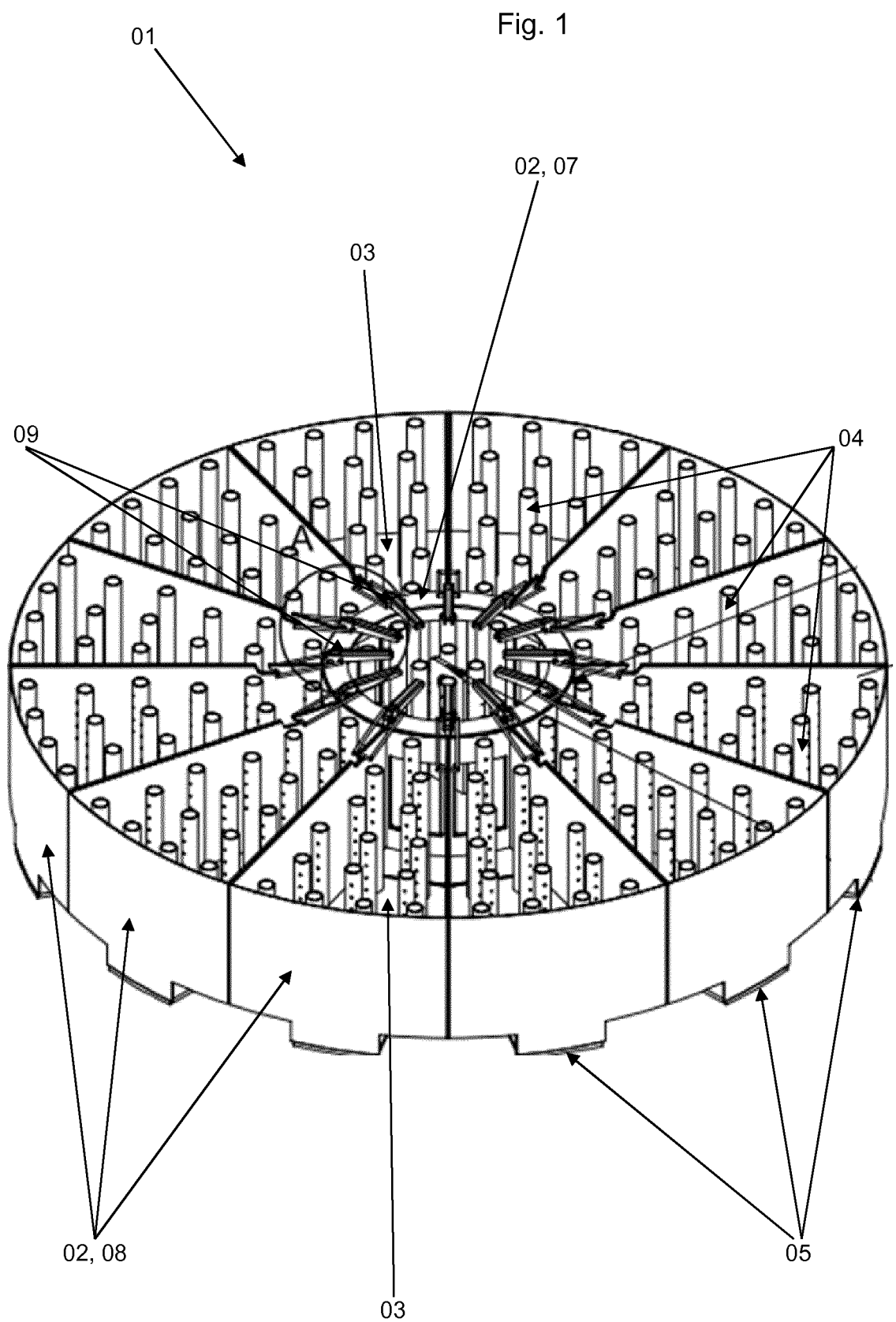
FIG. 1 shows an isometric view of the side and upper part of a floating tray for a catalytic chemical reactor (not shown) according to an embodiment of the invention.

01. Floating tray
02. Tray section
03. Section base
04. Fluid distribution element.
05. Tray support.
06. Wire mesh.
07. Center tray section.
08. Outer tray section.
09. Quick release locks.

DESCRIPTION OF THE DRAWINGS

Embodiments of the invention will be explained in more detail in the following with reference to the drawings as seen on FIG. 1, FIG. 2 and FIG. 3. Embodiments of the present invention are explained, by way of example, and with reference to the accompanying drawings. It is to be noted that the appended drawings illustrate only examples of embodiments of this invention and they are therefore not to be considered limiting of its scope, for the invention may admit to other alternative embodiments.

A catalytic reactor (not shown) comprises a hollow top compartment where process fluid enters. In this hollow space a floating tray 01 may be installed, in this embodiment providing not only the feature of fluid distribution from the process fluid inlet of the reactor to the catalyst bed (not shown), but also separation of particles from the inlet process fluid without demanding extra space added to the reactor. The floating tray is made by assembling tray sections 02 to an integrated rigid unit. A plurality of outer tray sections with a circular trapezoid shape i.e. a pie shape with a cut inner part with two linear sides, an arc shaped outer side and an arc shaped inner side. The arc shaped inner side is adapted to fit the circular shaped center tray section 07. All tray sections are shaped in a size enabling them to be mounted, assembled, detached and removed in the reactor via the top process fluid inlet (not shown) of the reactor, which makes the floating tray suitable for retrofitting existing reactors. The tray sections may comprise attachment means (not shown), interlocking them together when assembled and fixed by the quick release locks 09, which are shown in detail on the cut view of a part of the floating tray on FIG. 2. The quick release locks are all located adjacent to the center of the floating tray, which enables remote assembly and detachment of the tray, for instance by means of a hook pole operated from outside the reactor via the process fluid inlet opening in the top of the reactor. All tray sections comprise means such as lifting eyes or apertures for remotely lifting and moving them around in the reactor.

The tray sections comprise a section base 03 which is suited for collecting any particles which are introduced to the reactor with the process fluid inlet flow. The particles are removed from the inlet fluid flow by means of gravity and reduction of the fluid flow speed, which enables the particles to settle on the section base of the tray sections. Fixed to the section bases are fluid distribution elements 04 in the shape of pipes. The lower part of each fluid distribution elements has a fluid opening through an aperture in the section bases and the upper part of each fluid distribution elements is open. Thereby the fluid distribution elements provide fluid connection from the upper side of the floating tray, through the inside of the fluid distribution elements, through the section bases and out of the underside of the floating tray. As seen of FIG. 1 and FIG. 2, the fluid distribution elements are evenly divided throughout the entire cross sectional area of the floating tray. This enables the floating tray to provide an even fluid distribution of the process fluid which enters above the floating tray from the centrally located process fluid inlet and to the catalyst bed (not shown) below the floating tray inside the reactor. As seen on FIG. 1, the fluid distribution elements may further comprise apertures on the side of the pipes, which are adapted to distribute liquid from the tray and process fluid to the catalyst bed below. A liquid volume may be present within the floating tray with a volume dependent of the distance from the section base to the apertures on the side of the pipes.

Figure 2:
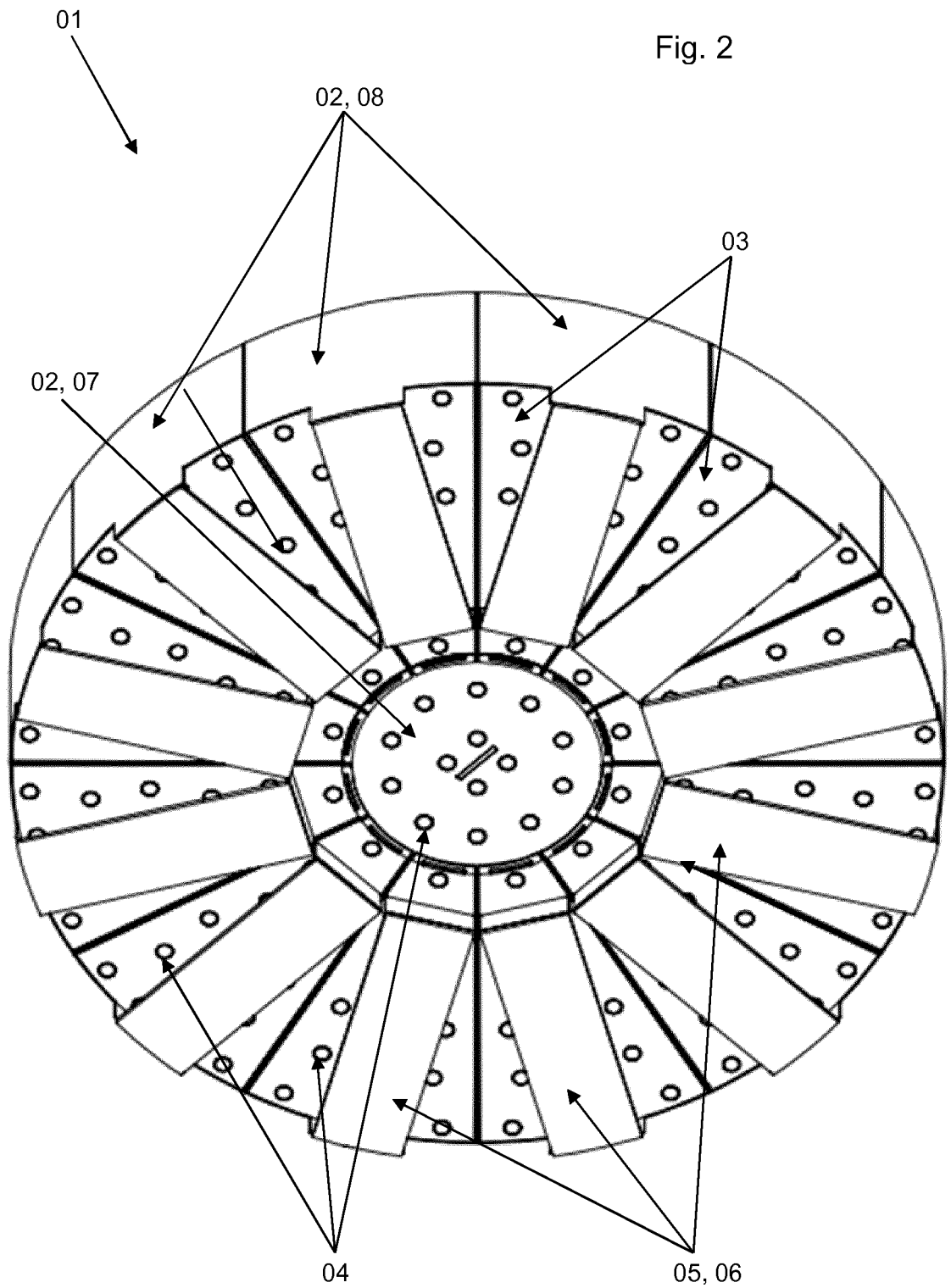
FIG. 2 shows an isometric view of the side and the underside of a floating tray for a catalytic chemical reactor (not shown) according to an embodiment of the invention.
Figure 3:
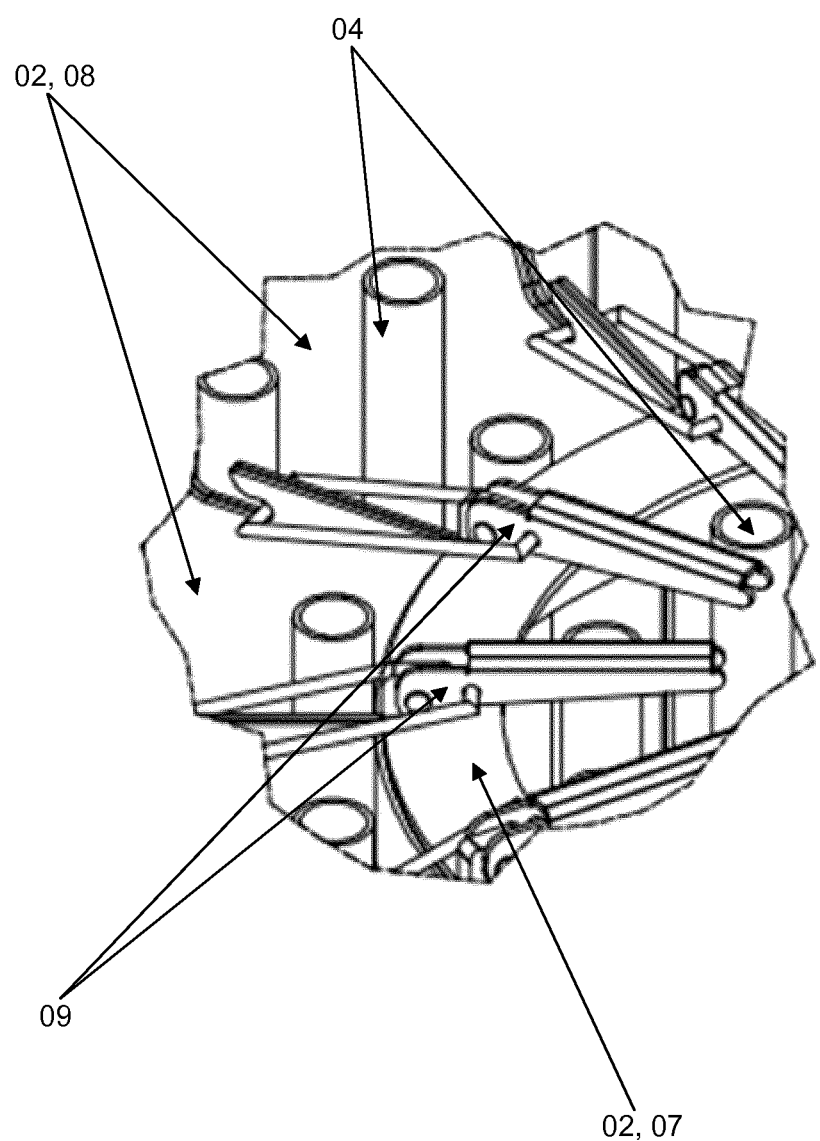
FIG. 3 shows a cut view of a detail of the floating tray according to an embodiment of the invention.

Each individual outer tray section and the assembled floating tray as a whole are supported by tray supports 05 as seen on FIG. 1 and FIG. 2. The tray supports enables the floating tray to be supported (to "float") on the catalyst bed within the reactor. Especially when retrofitting existing reactors, this is highly beneficial as it renders the floating tray independent of any mechanical supports in the reactor. Also it makes the mounting of the floating tray within the reactor simple, as there is no need for welds or support hangers between the tray and the reactor. The area of the tray support is adapted to be large enough to support the load of the floating tray plus any surplus load from particles and/or fluid collected within the tray without crushing or damaging the catalyst in the catalyst bed below the floating tray. A feature of the present embodiment is to make at least a part of the floating tray from wire mesh 06. This provides fluid flow also to the part of the catalyst bed which is covered by the floating tray support, hence enhancing the even distribution of the process fluid to the catalyst bed.

The invention claimed is:

1. Catalytic reactor comprising a catalyst bed, said reactor comprises a floating tray fluid distributor, distributing a reactor inlet fluid stream to the catalyst bed, said floating tray comprises a plurality of separate detachable tray sections and at least one fluid distribution element, wherein a plurality of said tray sections further comprises at least one tray support to support said floating tray on top of the catalyst bed, and wherein a plurality of the tray sections are connected by quick release locks, said quick release locks being adapted to be remotely released.

2. Catalytic reactor according to claim 1, wherein said floating tray is a combined fluid distributor and particle separator for separating particles from the reactor inlet fluid stream and distributing said inlet fluid stream to the catalyst bed, wherein a plurality of said tray sections each further comprise a section base adapted to collect particles.

3. Catalytic reactor according to claim 1, wherein said tray support comprises a wire mesh adapted to transfer the load of said floating tray to the top of the catalyst bed.

4. Catalytic reactor according to claim 1, wherein said tray support is adapted to act also as fluid stream distributer.

5. Catalytic reactor according to claim 1, comprising one center tray section and a plurality of outer tray sections.

6. Catalytic reactor according to claim 5, wherein the center tray section has a circular cross section and the outer tray sections have a circular trapezoid shape, the inner curved bases of the outer tray sections are adapted to fit the outer circumference of the centre tray section and the outer curved bases of the outer tray sections are adapted to fit inside the reactor.

7. Catalytic reactor according to claim 1, wherein the at least one distribution element are ducts with any cross sectional shape, a first end of each duct has an aperture and a second end of each duct is connected to a section base and an aperture in the section base within the periphery of the second end of each duct ensures fluid connection from the first end of each duct through the duct and through the section bases to enable fluid to flow from the upper side of the floating tray to the catalytic bed below the floating tray.

8. Catalytic reactor according to claim 7, wherein the at least one distribution element comprises one or more apertures on at least one of the sides of the duct.

9. Catalytic reactor according to claim 8, wherein the one or more apertures on at least one of the sides of the duct are oriented away from the center of the floating tray.

10. Catalytic reactor according to claim 1, wherein the at least one distribution element has a circular cross section.

11. Catalytic reactor according to claim 1, comprising a plurality of said distribution elements, wherein the distribution elements are evenly distributed on the cross section of the floating tray to provide an even distribution of fluid from the inlet fluid stream to the catalytic bed below the floating tray.

12. Catalytic reactor according to claim 1, wherein at least one of said tray sections comprise at least one lifting eye to enable the tray sections to be positioned within and removed from the reactor from outside the reactor.

13. Catalytic reactor according to claim 1, wherein at least one tray section comprises a plurality of sections with a cross sectional geometry enabling removal from the reactor without being locked by the adjacent tray sections.

14. Catalytic reactor according to claim 1, wherein at least one of said tray sections comprise assembly means and said tray sections are interlocked by said assembly means when assembled to form the floating tray as one integrated, rigid unit.

15. Catalytic reactor according to claim 1, wherein said catalytic reactor is a hydroprocessing reactor.

16. Catalytic reactor according to claim 1, wherein the reactor has a dome shaped upper part, the floating tray is located beneath or within the lower part of the dome.

17. Catalytic reactor comprising a catalyst bed, said reactor comprises a floating tray fluid distributor, distributing a reactor inlet fluid stream to the catalyst bed, said floating tray comprises a plurality of separate detachable tray sections and at least one fluid distribution element, wherein a plurality of said tray sections further comprises at least one tray support to support said floating tray on top of the catalyst be, wherein at least one of said tray sections comprise at least one lifting eye to enable the tray sections to be positioned within and removed from the reactor from outside the reactor, said lifting eye being arranged off center to the tray sections, enabling emptying collected particles from said tray sections within the reactor.

18. Catalytic reactor according to claim 17, wherein a plurality of the tray sections are connected by quick release locks.

19. Catalytic reactor according to claim 18, wherein said quick release locks are adapted to be remote released.

* * * * *